United States Patent Office 3,443,848
Patented May 13, 1969

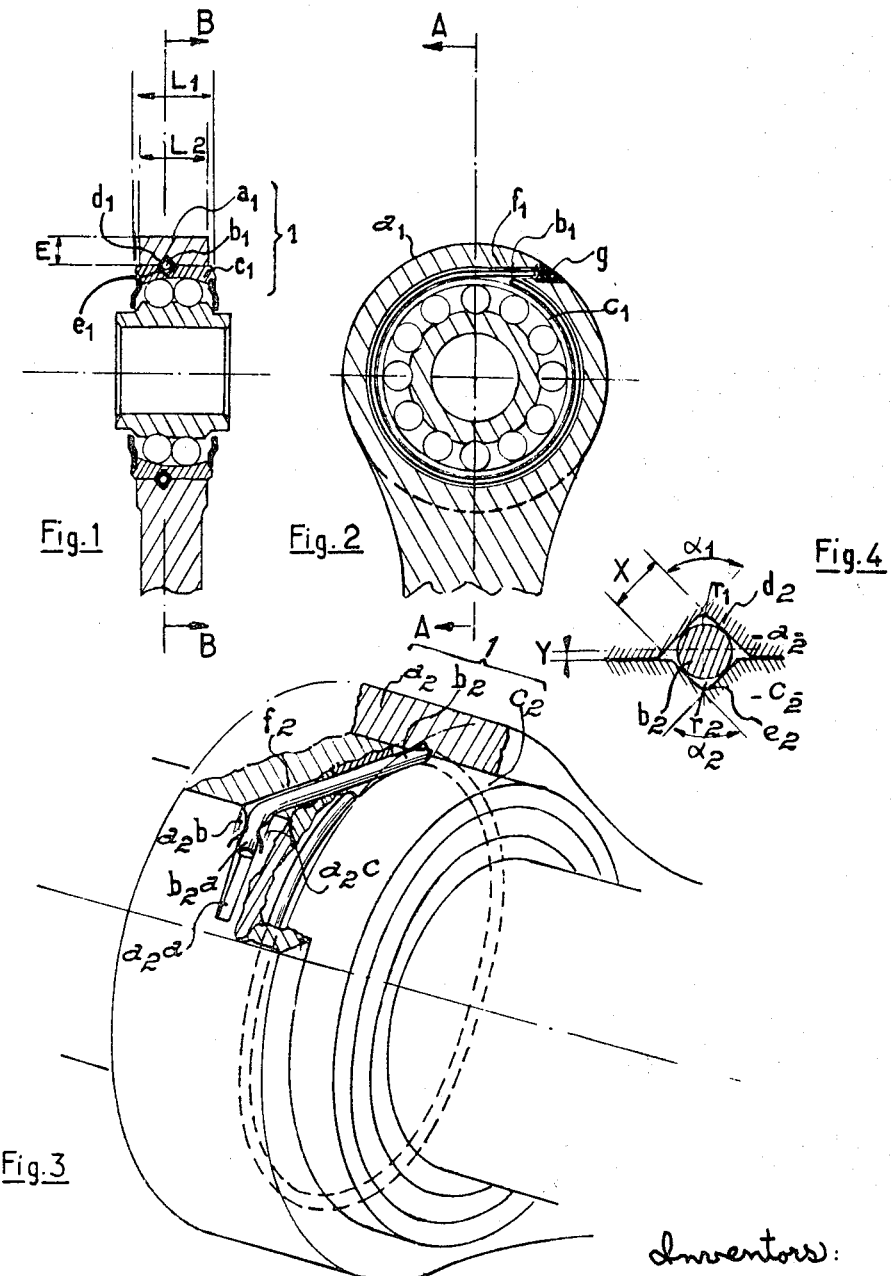

3,443,848
DEVICE FOR FIXING A CYLINDRICAL
PART IN ITS HOUSING
René Philippot, Chatenay-Malabry, Hauts-de-Seine, and
Maurice Richard, Essonne, France, assignors to Nord-
Aviation Societe Nationale de Constructions Aero-
nautiques, Paris, France, a joint-stock company of
France
Filed Oct. 24, 1966, Ser. No. 588,881
Claims priority, application France, Nov. 5, 1965,
37,520
Int. Cl. F16c 33/30
U.S. Cl. 308—236                                    4 Claims

ABSTRACT OF THE DISCLOSURE

A device for assembling and fixing a cylindrical part in a housing utilizing a groove in the periphery of the part to be fixed opposite a groove in the internal surface of the housing with a wire in the grooves and attached through a lateral channel in the support.

The present invention relates to a device intended for fixing a cylindrical part in its housing, and more particularly ball bearings or similar articulations inside rollers, pulleys, crank-shafts, forks, end-pieces and other movement-transmission members.

The search for lightness or economy of material in the assembly devices considered, frequently leads to solutions in which the weight ratio between the member to be fixed and its support must be as small as possible, these criteria being furthermore completed by other conditions, such as the absence of deformation during assembly, facility of subsequent dismantling and simplicity of application.

In these circumstances, amongst the numerous types of existing assemblies, there is no known device which simultaneously satisfies all these conditions.

The present invention has for its object a device in which the cylindrical part constituting the member to be fixed is assembled inside the support which forms its housing by means of a deformable element, the said device permitting, starting from a very simple machining operation of the said members and the support and by the utilization of a limited number of means, the weight ratio referred to above to be substantially reduced without thereby reducing in any appreciable manner the load factor which can be applied on the said members or resulting in mechanical stresses which are always undesirable due to their secondary effects.

The device forming the object of the invention is essentially characterized by the fact that it comprises:

Two circular grooves, one formed on the periphery of the mechanical part to be assembled, and the other in the interior of the corresponding support, an adjusting coupling with a precise sliding movement permitting the two grooves to be placed facing each other;

A channel tangential to the groove in the support and opening on the one hand into the said groove and on the other to the exterior of the support;

A deformable element advantageously but not exclusively constituted by a keeper-ring or a homogeneous assembly of wires previously introduced into the channel and occupying the space constituted by the two grooves arranged facing each other, so that the engaged extremity of the deformable element encounters the said element at the tangential point of the channel with the supporting groove, the other extremity being at the exterior of the support.

In accordance with a further characteristic of the invention, the free extremity of the deformable element is immobilized by a fixing system of any desired kind.

A device of this kind in accordance with the invention brings out quite clearly, on the one hand the fact that once it has been put into position, two degrees of freedom are eliminated by the adjustment, the third being eliminated by the deformable element thus producing the desired fixation and that, on the other hand, the width of the support in the axial direction and taking into account the admissible contact pressures, can be as small as may be desired, which results at the same time, for a given thickness, in an advantageous reduction of the material ratio between the cylindrical part and its support.

In addition, the machining of the grooves and the channel is very simple and can be carried out on parts which have not been initially designed for assembly by the device forming the object of the invention, and the assembly or dismantling of the deformable element is very easy and can be effected very rapidly without special tools. Finally, no additional mechanical stress is applied to the cylindrical part and to its corresponding support, and this is true at all stages of the operation.

All the characteristic features and advantages of the invention will be more clearly brought out in the description which follows below with reference to the accompanying drawings given by way of example and not in any sense by way of limitation, of preferred forms of embodiment of the invention, in which the device is applied respectively to the case of fixing a ball knuckle joint and a ball bearing on a big-end or crankhead.

In the drawings:

FIGS. 1 and 2 are sections taken respectively along the lines A—A and B—B in a big-end provided by way of example with a ball bearing swivel joint;

FIG. 3 is a perspective view with parts broken away, of a big-end provided with a rigid ball bearing;

FIG. 4 shows a partial transverse section and represents to a larger scale an arrangement of the deformable element in its housing.

The device according to the invention is represented by the parts having the general reference 1 in FIGS. 1, 2 and 3, and is essentially constituted by an articulation $e$, a keeper ring $b$ and a support $a$.

In FIG. 1, which is a cross-section taken along the line A—A of FIG. 2, there has been shown a ball bearing swivel joint $c_1$ fitted with a precise sliding action in a big-end $a_1$ and a keeper ring $b_1$ constituted by a flexible wire, commonly known as a "Piano wire" and housed in the space left free by the grooves $d_1$ and $e_1$ which face each other. The ring $b_1$ is introduced tangentially through the channel $f_1$ shown in FIG. 2, which is a cross-section along the line B—B of FIG. 1. The engaged extremity of the keeper ring $b_1$ comes into abutment against the tangential part of the said ring $b_1$, thus permitting it to be immobilized in a first direction, immobilization in the other direction being effected by a plug $g$, for example of a cold polymerizable resin which closes the channel $f_1$. It can be seen from FIG. 1 that the width $L_2$ of the support can be very much less than the width $L_1$ of the swivel joint $c_1$, and that the width E of the said support can be small in proportion to the dimensions of the grooves which can furthermore be carried out easily on parts which have not been prepared for that purpose.

Similarly, the relative position of the keeper-ring $b_1$ can be centered at $L_{1/2}$ or $L_{2/2}$, or at any other convenient ratio such as $L_{1/3}$, which ratio has been taken by way of example in the case of the ball-bearing swivel-joint of FIG. 1.

In FIG. 3, there has been shown an alternative form of the method of immobilization of the free extremity of the keeper-ring $b_2$ which permits the fixing of a rigid ball bearing $C_2$ on a big-end $a_2$. It can be seen from FIG. 3 that the said extremity has been bent at $b_{2a}$ so as to be located in a groove $a_{2a}$ which forms an extension of the channel $f_2$ and which is arranged for example tangentially to the big-end $a_2$, while small metal tongues $a_{2b}$, $a_{2c}$ formed in the flanks of the groove $a_{2a}$ have been bent back over the portion $b_{2a}$ of the keeper-ring $b_2$ in order to ensure its fixing.

In FIG. 4, which shows an enlarged view of the transverse section of the keeper-ring $b_2$ in its housing, it is also seen that the parameters Y, X, $\alpha_1$, $\alpha_2$, $r_1$ and $r_2$, define respectively the axial play, the depth of the grooves, the supporting angles of the ring, the radii of curvature of the bottom of the grooves, and can always be adapted as a function of the nature of the materials and of special conditions of operation, such as for example with a notch effect and/or a predetermined degree of mechanical precision, so as always to provide the optimum application and use of the device forming the object of the invention.

It will of course be understood that the above examples of utilization of the device according to the invention have only been given so as to show some possible applications and that other applications may be made within the spirit of the invention without thereby departing from its scope.

We claim:
1. A device for accurately assembling and fixing a cylindrical part in a corresponding housing formed in a support, said device comprising:
   a first circumferential groove formed in the periphery of said cylindrical part to be fixed;
   a second circumferential groove formed in the internal surface of the housing constituted in said support, said first and second grooves being located facing each other during assembly, by a precise sliding adjustment of said cylindrical part in said housing;
   a lateral channel formed in said support and having one extremity opening tangentially into the interior of said second circumferential groove, and the other extremity of which opens into the outer surface of said support;
   a deformable thread-like element which, after the above-mentioned adjustment of the cylindrical part in its housing, is introduced into said lateral channel of said support and which occupies, at least in part, the volume formed by said two grooves facing each other, and has an extremity which opens into said lateral channel of said support opening to the outer surface of said support, said extremity of said deformable element bent so as to be engaged in a further groove formed in the surface of said support and blocked in this position;
   each of said grooves having V-shaped surfaces with said surfaces substantially tangent to the surface of said thread-like element.

2. A device for accurately assembling and fixing a cylindrical part in a corresponding housing formed in a support, said device comprising:
   a first circumferential groove formed in the periphery of said cylindrical part to be fixed;
   a second circumferential groove formed in the internal surface of the housing constituted in said support, said first and second grooves being located during assembly facing each other, by a precise sliding adjustment of said cylindrical part inside said housing;
   a lateral channel formed in said support and having one extremity opening tangentially to the interior of said second circumferential groove, and of which the other extremity opens into the outer surface of said support;
   a deformable thread-like element which, after said above adjustment of the cylindrical part in its housing, is introduced through said lateral channel of said support and which occupies, at least in part, the volume comprised by the two said grooves facing each other, so that the extremity of said element engaged inside said space meets the part of the element in the vicinity of the opposite extremity, at the tangential point of the lateral channel with the circumferential groove formed in the support, while the other extremity of said element is housed in the lateral channel which opens to the exterior of said support and is bent so as to be engaged in a further groove formed in the surface of the support and is blocked in this position;
   each of said grooves having V-shaped surfaces with said surfaces substantially tangent to the surface of said thread-like element.

3. A device for the accurate assembly and fixing of a cylindrical part in a corresponding housing formed in a support, as claimed in claim 2, in which said deformable thread-like element is constituted by at least one metal wire of circular section.

4. A mechanical articulation serving as a coupling and a transmission of movements, comprising a crank-head and a swivel joint bearing intended to be housed in a corresponding housing of said crank-head, and means for fixing said swivel joint in said housing, said means comprising:
   a first circumferential groove formed in the periphery of said swivel joint bearing;
   a second circumferential groove formed in the internal surface of the housing constituted in said crank-head, said first and second grooves being located during assembly facing each other, by a precise sliding adjustment of said swivel in said housing;
   a lateral channel formed in said crank-head having one extremity opening tangentially at the interior of said second circumferential groove, while the other extremity opens into the external surface of said crank-head;
   a deformable thread-like element which, after the above said adjustment of the said swivel in its housing, is introduced through said lateral channel of said crank-head, and which occupies, at least in part, the space formed between said two grooves when facing each other, and has an extremity which opens into said lateral channel of said crank-head to the outer surface of said crank-head, said extremity of said deformable element bent so as to be engaged in a further groove formed in the surface of said crank-head and blocked in this position;
   each of said grooves having V-shaped surfaces with said surfaces substantially tangent to the surface of said thread-like element.

References Cited

UNITED STATES PATENTS

| 1,028,844 | 6/1912 | Wingquist | 308—194 |
| 1,464,386 | 8/1923 | Ingram. | |
| 1,751,795 | 3/1930 | De Kome | 308—236 |

FOREIGN PATENTS 671,341   2/1939   Germany.

MARTIN P. SCHWADRON, *Primary Examiner.*

FRANK SUSKO, *Assistant Examiner.*